(12) United States Patent
Ashikhmin et al.

(10) Patent No.: US 9,094,144 B2
(45) Date of Patent: Jul. 28, 2015

(54) METHODS AND APPARATUS FOR CODE DIVISION MULTIPLE ACCESS COMMUNICATION USING CODE BOOK THAT PROVIDES REDUCED PEAK-TO-AVERAGE POWER RATIO

(75) Inventors: Alexei Ashikhmin, Morristown, NJ (US); Jung-Tao Liu, Madison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1299 days.

(21) Appl. No.: 10/835,085

(22) Filed: Apr. 29, 2004

(65) Prior Publication Data

US 2005/0243895 A1 Nov. 3, 2005

(51) Int. Cl.
*H04B 1/7097* (2011.01)
*H04J 13/00* (2011.01)
*H04J 13/10* (2011.01)

(52) U.S. Cl.
CPC ....... *H04J 13/00* (2013.01); *H04B 2201/70706* (2013.01); *H04J 13/10* (2013.01)

(58) Field of Classification Search
CPC .................. H04L 25/03343; H04L 25/03828
USPC .......................................... 375/284, 296, 146
See application file for complete search history.

(56) References Cited

U.S. PATENT DOCUMENTS

| | | | |
|---|---|---|---|
| 6,310,869 B1 * | 10/2001 | Holtzman et al. | 370/335 |
| 6,314,107 B1 * | 11/2001 | Shanbhag | 370/441 |
| 6,389,138 B1 * | 5/2002 | Li et al. | 380/35 |
| 6,563,808 B1 * | 5/2003 | Cox et al. | 370/335 |
| 6,680,978 B1 | 1/2004 | Schneider et al. | 375/242 |
| 7,453,954 B2 * | 11/2008 | Wright et al. | 375/296 |

FOREIGN PATENT DOCUMENTS

EP  1 359 678 A  11/2003

OTHER PUBLICATIONS

Ottosson, T., "Precoding for Minimization of Envelope Variations in Multicode DS-CDMA Systems," Wireless Personal Communications, Kluwer Academic Publishers, NL vol. 13, No. 1/2, pp. 57-77 (May 2000).

Murphy, C. D., "High-order Optimum Hexagonal Constellations," Personal, Indoor and Mobile Radio Communications, 2000. PIMRC 2000. The 11$^{th}$ IEEE International Symposium, Piscataway, NJ, pp. 143-146 (Sep. 2000).

(Continued)

*Primary Examiner* — Kevin Kim
(74) *Attorney, Agent, or Firm* — Ryan, Mason & Lewis, LLP (57) ABSTRACT

A method and apparatus are provided for generating a code book for use in a CDMA system. The code book comprises of a plurality of vectors that are used to encode user data. An amplitude and polarity for each vector in the code book are selected to provide a reduced peak-to-average power ratio. The amplitude values can be selected to provide a reduced peak-to-average power ratio while maintaining a desired average energy per chip. The desired energy per chip can be based on the energy per chip of a CDMA system having a lower order spreading factor. Performance can be further improved by employing a first code book under a first signal-to-noise ratio condition and a second code book under a second signal-to-noise ratio condition.

28 Claims, 6 Drawing Sheets

(56) References Cited

OTHER PUBLICATIONS

Sathanathan et al., "Peak-to-Average power ratio analysis in multicode cdma," 2002 IEEE 56th Vehicular Technology Conference Proceedings, Vancouver, Canada, vol. 1 of 4, pp. 500-504 (Sep. 2002).

Davis et al., "Peak-to-Mean Power Control in OFDM, Golay Complementary Sequences, and Reed-Muller Codes", IEEE Transaction on Information Theory, vol. 45, pp. 2397-2417 (Nov. 1999).

Tadahiro Wada, "Characteristics of Bit Sequences Applicable to Constant Amplitude Orthogonal Multicode Systems", IEICE Trans. Fundamentals, vol. E83-A, No. 11 (Nov. 2000).

Kim et al., "Enhancement of Constant Amplitude Coding for Multicode Wideband CDMA Systems", IEICE Trans. Commun., vol. E83-B, No. 11 (Nov. 2000).

\* cited by examiner

METHODS AND APPARATUS FOR CODE DIVISION MULTIPLE ACCESS COMMUNICATION USING CODE BOOK THAT PROVIDES REDUCED PEAK-TO-AVERAGE POWER RATIO

FIELD OF THE INVENTION

The present invention relates to code division multiple access (CDMA) communication systems and, more particularly, to direct sequence CDMA (DS-CDMA) systems having reduced peak-to-average power ratios (PAPRs).

BACKGROUND OF THE INVENTION

CDMA techniques transmit multiple information signals on the same channel, and differentiate each user sub-channel by encoding it with a unique spreading code. Originally, CDMA networks were designed to carry only voice traffic and exhibited limited data rate variability. CDMA networks, however, are evolving to encompass a variety of applications, each requiring potentially different data rates or quality of service needs. A CDMA system that employs four spreading codes is said to have a "spreading factor" of four and can transmit four distinct streams of data.

The output of a given CDMA transmitter is generally the sum, s, of each data stream multiplied by the corresponding spreading code. In a system having a spreading factor of four, there are 16 possible output vectors, $\underline{s}$. It can be shown that the peak-to-average power ratio of such a CDMA system is the maximum value over each possible output vector, $\underline{s}$, of the peak energy divided by the average energy. If the peak-to-average power ratio of a CDMA system is greater than one then it is obvious that power of different signals vary. Thus, when the output vector, $\underline{s}$, is amplified prior to transmission by a non-linear amplifier, which are commonly found in communications devices, the transmitted signal will be amplified differently for each possible output vector, $\underline{s}$, creating non-linear distortion.

A need therefore exists for a CDMA system that provides a reduced peak to average power ratio.

SUMMARY OF THE INVENTION

Generally, a method and apparatus are provided for generating a code book for use in a CDMA system. The code book comprises of a plurality of vectors that are used to encode user data. According to one aspect of the invention, the amplitude and polarity for each vector in the code book are selected to provide a reduced peak-to-average power ratio. The amplitude values can be selected to provide a reduced peak-to-average power ratio while maintaining a desired average energy per chip. The desired energy per chip can be based on the energy per chip of a CDMA system having a lower order spreading factor.

In one exemplary implementation, a CDMA system has a spreading factor of eight for communicating eight distinct data streams. One or more of the data streams can be reserved to maintain a desired data rate, such as a data rate of a CDMA system with a spreading factor of four. The exemplary code book employs vectors having amplitude values that provide a significant reduction in the peak-to-average power ratio, relative to a frequently deployed conventional CDMA system having a spreading factor of four. In a further variation, performance can be further improved by employing a first code book under a first signal-to-noise ratio condition and a second code book under a second signal-to-noise ratio condition.

From the system point of view, a CDMA transmitter incorporating features of the present invention comprises a plurality of multipliers that multiply an encoded data stream by a corresponding spreading code. The encoded data stream is based on a code book comprised of a plurality of vectors, each of the vectors having non-uniform amplitude values selected to provide a reduced peak-to-average power ratio, in accordance with the present invention.

A more complete understanding of the present invention, as well as further features and advantages of the present invention, will be obtained by reference to the following detailed description and drawings.

DETAILED DESCRIPTION

Figure 1:
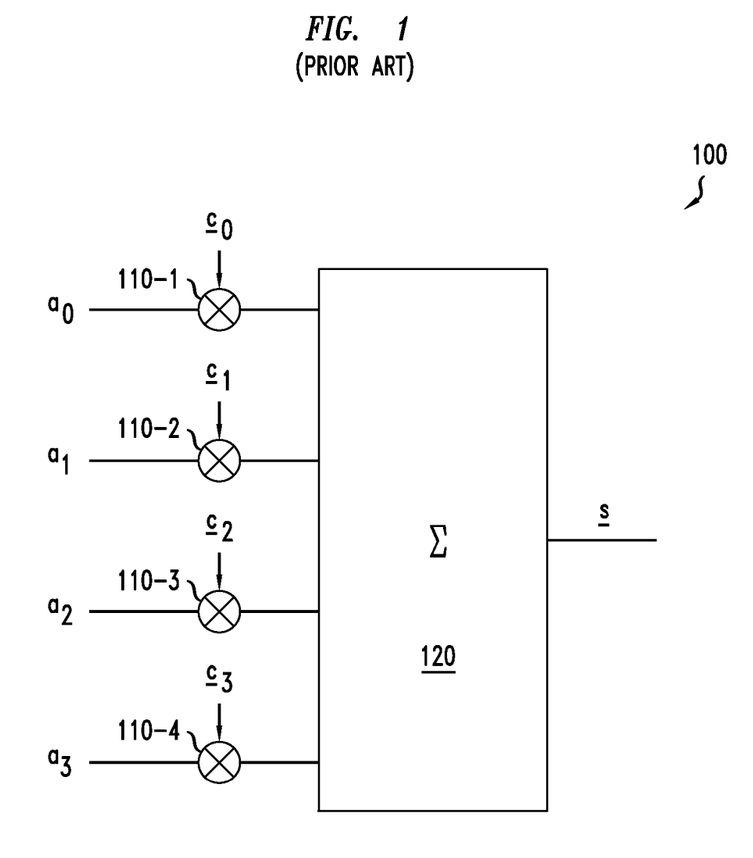
FIG. 1 illustrates a conventional DS-CDMA system.

FIG. 1 illustrates a conventional DS-CDMA system 100 with a spreading factor (SF) of four (4). The conventional DS-CDMA system 100 is used, for example, in mobile telephones. For a detailed discussion of exemplary DS-CDMA systems 100, see, for example, T. Ottosson, "Precoding for Minimization of Envelope Variations in Multicode DS-CDMA Systems," Wireless Personal Communications, 13, 57-78 (2000), incorporated by reference herein.

The conventional DS-CDMA system 100 shown in FIG. 1 is used for simultaneous transmission of four streams of information, $a_0, a_1, a_2$ and $a_3$, that carry information of streams 0, 1, 2, and 3, respectively. Variables $a_0, a_1, a_2$ and $a_3$ form the vector $\underline{a} = (a_0, a_1, a_2, a_3)$. The vector $\underline{s}$ is referred to as the output vector that is applied to a communications channel. The vectors $\underline{c}_0$, $\underline{c}_1$, $\underline{c}_2$ and $\underline{c}_3$ are spreading sequences. Generally, each information stream $a_0, a_1, a_2$ and $a_3$ is multiplied by a corresponding spreading sequence, $\underline{c}_0$, $\underline{c}_1$, $\underline{c}_2$ and $\underline{c}_3$, respectively, by corresponding multipliers 110-1 through 110-4, and the spread signals are combined at stage 120 prior to application to the channel.

Figure 2:
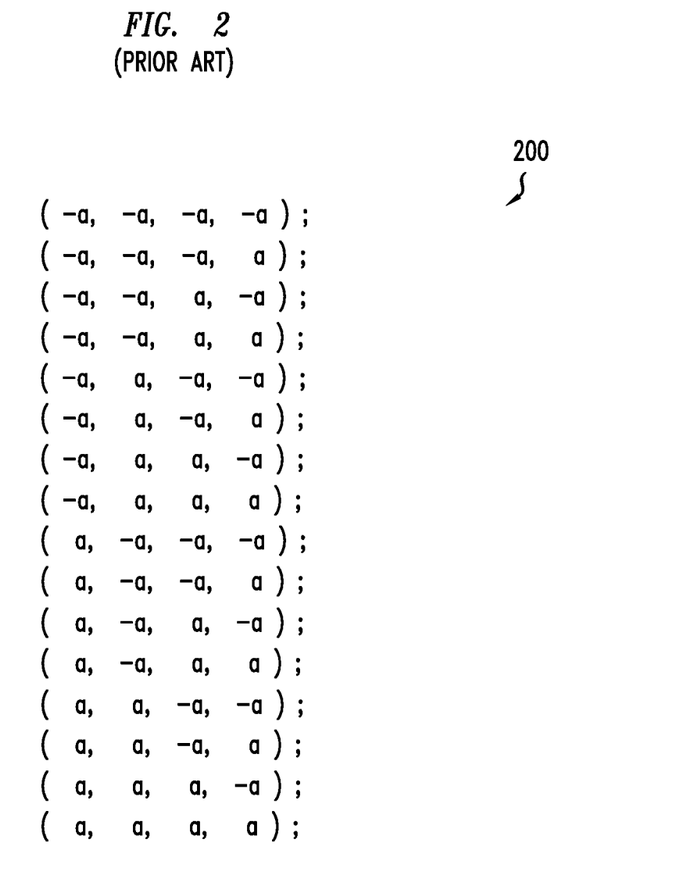
FIG. 2 illustrates an exemplary code book that can be employed by the DS-CDMA system of FIG. 1.

FIG. 2 illustrates an exemplary code book A 200 that can be employed by the DS-CDMA system 100 of FIG. 1. Thus, the vectors $\underline{a}$ form the code book A of FIG. 2. The information bit from the ith information stream is encoded into the sign of the ith entry of a vector $\underline{a}$. The logical zeroes (0s) correspond to positive entries of a vector $\underline{a}$ and logical ones (1s) correspond to negative entries. For example, in order to transmit logical zero in the 0th and 3rd information streams and logical one in the 1st and 2nd streams, the vector $\underline{a} = (a, -a, -a, a)$ is transmitted. The value a is the amplitude of transmitted signals. Typically, the amplitudes of each of the four streams of information, $a_0, a_1, a_2$ and $a_3$, are the same. In some implementations of the conventional DS-CDMA system 100, the amplitude of one or more of the four streams of information, $a_0, a_1, a_2$ and $a_3$, may be increased to provide a corresponding increase in energy (and thus protection) of the stream. For example, the amplitude of stream $a_0$, which may be associated with a pilot signal, may be increased to improve the channel estimation.

The vectors $\underline{c}_0$, $\underline{c}_1$, $\underline{c}_2$, $\underline{c}_3$ are spreading sequences assigned to corresponding information streams.

The spreading sequences $\underline{c}_0$, $\underline{c}_1$, $\underline{c}_2$, $\underline{c}_3$ are defined as follows:

$\underline{c}_0 = (1, 1, 1, 1)$,
$\underline{c}_1 = (1, -1, 1, -1)$,
$\underline{c}_2 = (1, 1, -1, -1)$,
$\underline{c}_3 = (1, -1, -1, 1)$.

It can be seen that these sequences form rows of the well-known Hadamard matrix $H_4$ of dimension four (see, e.g., F. J. MacWilliams and N. J. A. Sloane, The Theory of Error-Correcting Codes, North-Holland (1977)), as follows:

$$H_4 = \begin{bmatrix} 1, & 1, & 1, & 1 \\ 1, & -1, & 1, & -1 \\ 1, & 1, & -1, & -1 \\ 1, & -1, & -1, & 1 \end{bmatrix},$$

and therefore they are orthogonal. In other words $$\underline{c}_i \cdot \underline{c}_j = \begin{cases} 4, & \text{if } i = j; \\ 0, & \text{if } i \neq j; \end{cases} \quad (1)$$

where the multiplication · is the inner product of two vectors defined by the following rule:

$(x_0, x_1, \ldots, x_{n-1}) \cdot (y_1, y_2, \ldots, y_{n-1}) = x_0 y_0 + x_1 y_1 + \ldots x_{n-1} y_{n-1}$.

For example, $\underline{c}_1 \cdot \underline{c}_2 = (1,-1,1,-1) \cdot (1,1,-1,-1) = 1-1-1+1=0$, but $\underline{c}_1 \cdot \underline{c}_1 = (1,-1,1,-1) \cdot (1,-1,1,-1) = 1+1+1+1=4$.

The output vector $\underline{s}=(s_0,s_1,s_2,s_3)$, which is later modulated and then transmitted into the channel, is computed as follows:

$\underline{s} = \underline{a} \cdot H_4 = a_0 \underline{c}_0 + a_1 \underline{c}_1 + a_2 \underline{c}_2 + a_3 \underline{c}_3$.

The multiplication operation $a_i \underline{c}_i$ occupies four chips of time. Therefore, in any DS-CDMA system, such as the DS-CDMA system 100 of FIG. 1, with the spreading factor of four, variables $a_0, a_1, a_2$ and $a_3$ cannot change their values faster than every four consecutive chips.

Thus, the DS-CDMA system 100 is a system in which the variables $a_1, a_2, a_3$ take new values every four chips, and the variable $a_0$ takes a new value only every m chips, where m is an integer divisible by 8. It is assumed that the 0th stream plays a special role in the system 100. For example, the 0th stream of a mobile telephone can be used for transmitting voice, while other streams can be used for transmitting data. The voice changes significantly slower compared to data and therefore $a_0$ has to take a new value only every i consecutive chips. Another common and important case is when the 0th stream is used for transmitting a pilot signal. The pilot signal usually remains constant for a long time interval, typically 256 chips, that allows the decoder to accurately estimate the channel fading coefficient.

The rate of a DS-CDMA system 100 is defined as the average number of information bits transmitted per chip. It is easy to see that the DS-CDMA system 100 has the following rate:

$$R_A = \frac{3\frac{m}{4}+1}{m}. \quad (2)$$

Decoding

During transmission through an exemplary channel, the vector $\underline{s}$ is corrupted by additive noise and the vector $\underline{x}=\underline{s}+\underline{z}$ is received, where $\underline{z}$ is a vector of noise. To recover a value of $a_i$, a despreading procedure is used, which consists of multiplying the received vector $\underline{x}$ by the vector $\underline{c}_i$:

$h_i = \underline{x} \cdot \underline{c}_i = (\underline{s}+\underline{z}) \cdot \underline{c}_i = (a_0 \underline{c}_0 + a_1 \underline{c}_1 + a_2 \underline{c}_2 + a_3 \underline{c}_3) \cdot \underline{c}_i + \underline{z} \cdot \underline{c}_i$. (3)

Taking into account the orthogonality property of equation (1), the following is obtained:

$h_i = 4a_i + \underline{z} \cdot \underline{c}_i$.

Finally, the sign of $h_i$ is computed and the original bit is reconstructed as $\hat{a}_i = \text{sign}(h_i)a$. If the channel noise is not very strong, in other words, if entries of the vector $\underline{z}$ are small numbers, then with a large probability the quantity $|\underline{z} \cdot \underline{c}_i|$ will be smaller than $|4a_i|$. Therefore, $h_i$ will have the same sign as $a_i$, and hence $\hat{a}_i$ will be equal to $a_i$.

For example, without loss of generality it can be assumed that $a=1$. Let $\underline{a}=(1, -1, 1, 1)$ and $\underline{z}=(2.1, -1.8, -1.85, -1.75)$. Then, $\underline{s}=(2, 2, -2, 2)$ and $\underline{h}=(2.1, -1.8, -1.85, -1.75)$. Computing, for instance, $h_1$ according to equation (3), $h_1$ equal to $-3.3$ and $\hat{a}_1 = a_1$ are obtained.

Since the variable $a_0$ changes its value only every m chips and since it is spread with the help of the sequence $\underline{c}_0=(1,1,1,1)$, the value of $a_0$ is reconstructed using a different rule. $\underline{x}^{(i)}$, $i=1, \ldots, m/4$ denotes vectors received from the channel after transmitting m chips. $\underline{z}^{(i)}$, $i=1, \ldots, m/4$ denotes the corresponding noisy vectors. To determine the value $a_0$, compute:

$$h_0 = \sum_{i=1}^{m/4} \underline{x}^{(i)} \cdot \underline{c}_0 = \sum_{i=1}^{m/4} \sum_{j=0}^{3} x_j^{(i)} = ma + \sum_{i=1}^{m/4} \sum_{j=0}^{3} z_j^{(i)},$$

and reconstruct $\hat{a}_0 = \text{sign}(h_0)a$. It can be shown that the probability of decoding error, defined below, is significantly lower for $a_0$ compared to other values of $a_i$.

The bit error probability of a DS-CDMA system, such as the DS-CDMA system 100, is defined as follows:

$Pr(\hat{a}_i \neq a_i) = Pr(\text{sign}(\hat{a}_i) \neq \text{sign}(a_i))$.

PAPR of the DS-CDMA System 100

The energy of a vector of signals $\underline{x}=(x_0, x_1, \ldots, x_{n-1})$ is defined as $x_0^2 + x_1^2 + \ldots + x_{n-1}^2$.

Hence, the average energy per chip of an output vector $\underline{s}$ equals:

$$E_{av}(s) = \frac{1}{4}(s_0^2 + s_1^2 + s_2^2 + s_3^2).$$

The average energy per chip for the system is defined as the value $E(\underline{s})$ averaged over all 16 possible vectors $\underline{s}$ corresponding to vectors from code book A, shown in FIG. 2.

$$E_A = \frac{1}{16}\sum_{\underline{s}} E_{av}(\underline{s}). \tag{4}$$

The peak energy of $\underline{s}$ is defined as $$E_{peak}(\underline{s}) = \max_{0 \le i \le 3}\{s_i^2\}. \tag{5}$$

The peak to average power ratio of the DS-CDMA system 100 equals:

$$PAPR_A = \max_{\underline{s}} \frac{E_{peak}(\underline{s})}{E_A}. \tag{6}$$

Thus, the peak to average power ratio will vary. For non-linear amplifiers, which are commonly found in communications devices, such as mobile telephones, different components of the transmitted signal will be amplified differently, creating non-linear distortion. A need therefore exists for a DS-CDMA system that provides a reduced peak to average power ratio.

Let $H_n$ be an n dimensional Hadamard matrix and $\underline{y}=(y_0, \ldots, y_{n-1})$ be a real vector and $\underline{v}=\underline{y}H_n$. The Parseval rule (see, e.g., F. J. MacWilliams and N. J. A. Sloane, The Theory of Error-Correcting Codes, Chapter 14.3, Corollary 3) relates the energy of the vector $\underline{y}$, which equals $$E(\underline{y}) = y_0^2 + \ldots + y_{n-1}^2,$$

to the energy of the vector $\underline{v}$, $E(\underline{v})=v_0^2 + \ldots + v_{n-1}^2$, by the following equality:

$$E(\underline{v}) = nE(\underline{y}) \tag{7}$$

If a vector $\underline{a}=(a_0,a_1,a_2,a_3)$ is transmitted, then according to the Parseval rule (equation (7)), the corresponding output vector $\underline{s}$ will have the following average energy per chip:

$$E_{av}(\underline{s}) = \frac{1}{4}(s_0^2 + s_1^2 + s_2^2 + s_3^2) = \frac{1}{4}4(a_0^2 + a_1^2 + a_2^2 + a_3^2) = 4a^2. \tag{8}$$

Thus, according to equation (4):

$$E_A = 4a^2. \tag{9}$$

The PAPR of the DS-CDMA system 100 is now estimated. It can be shown that half of the output vectors $\underline{s}=(s_0, s_1, s_2, s_3)$ have the property that three variables of $s_0, s_1, s_2, s_3$ are zeros and one variable has the absolute value $|4a^2|$ For instance, if $\underline{a}=(a, a, -a, -a)$, then the corresponding output vector has the form $\underline{s}=(0, 0, 4a, 0)$. The second half of the output vectors have the property that all $s_0, s_1, s_2, s_3$ variables have the same absolute value $|2a|$. For instance, if $\underline{a}=(a, -a, a, a)$, then $\underline{s}=(2a, 2a, -2a, 2a)$. Therefore, according to equations (6), (5), and (9), the peak to average power ratio of the DS-CDMA system 100 can be expressed as follows:

$$PAPR_A = \frac{(4a)^2}{4a^2} = 4.$$

Improved DS-CDMA System

Figure 3:
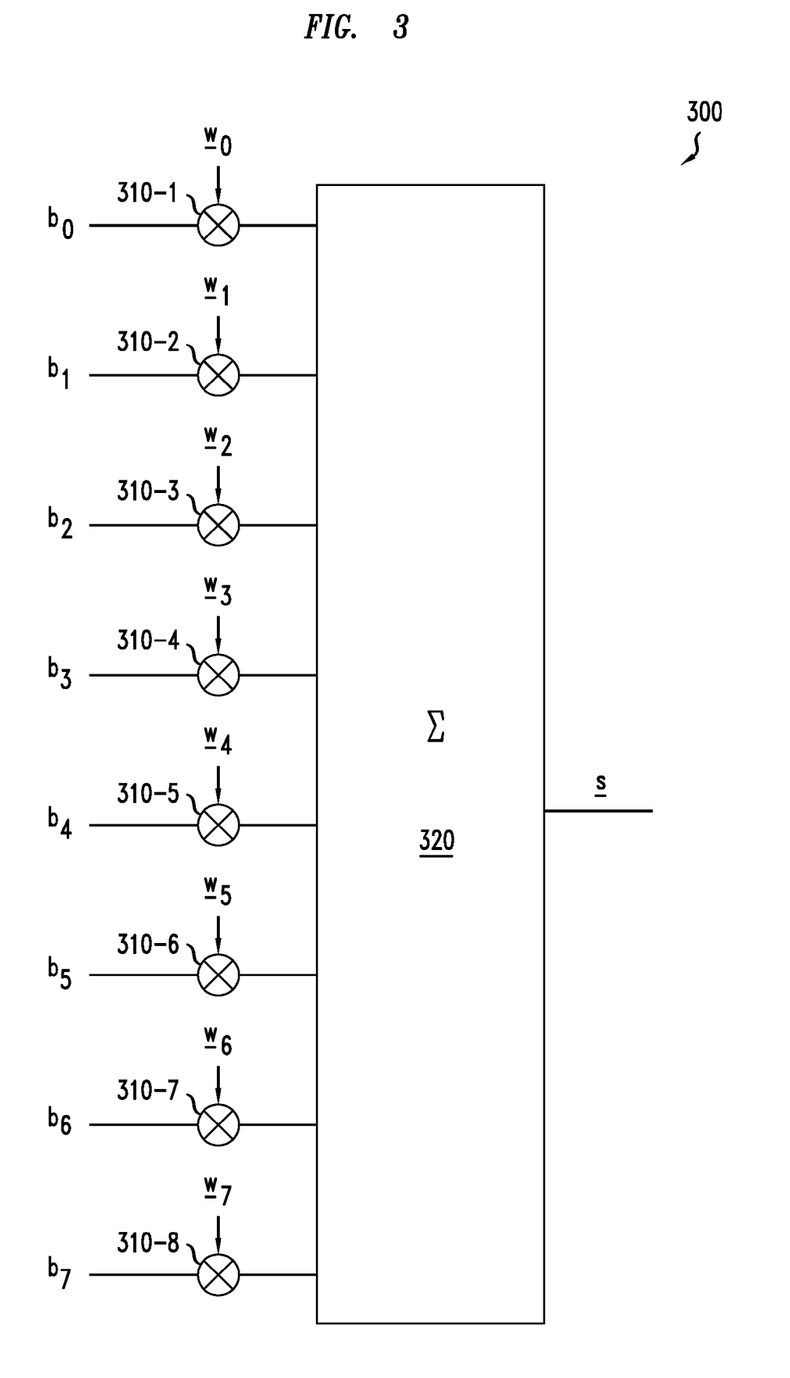
FIG. 3 illustrates a DS-CDMA system incorporating features of the present invention.

FIG. 3 illustrates a DS-CDMA system 300 incorporating features of the present invention. The exemplary DS-CDMA system 300 provides a spreading factor SF=8, with a reduced peak to average power ratio and bit error probability, relative to the conventional DS-CDMA system 100. In various implementations, the DS-CDMA system 300 can have the same (i) rate, (ii) average energy per chip and (iii) amplitude, a, of signals transmitted in the 0th stream as the conventional DS-CDMA system 100. In this manner, the rate of the conventional system is maintained without increasing the average power per chip. In addition, the power for signals transmitted in the 0th stream is not changed, thereby resulting in the same bit error probability. Since the 0th stream plays a special role in the system it can be important to maintain the bit error probability for the 0th stream, relative to the DS-CDMA system 100. For example, if the 0th stream is used for sending a pilot signal and the amplitude of the signal is reduced, this will result in a less accurate estimate of the channel fading coefficients, which, in turn, leads to failure to decode other streams of information.

Vectors $\underline{b}=(b_0, b_1, b_2, b_3, b_4, b_5, b_6, b_7)$ are taken from the code book, defined below in conjunction with FIG. 4. In the exemplary implementation, only streams 0, 1, . . . , 6 carry information and stream 7 plays an auxiliary role. The signs (polarities) of the variables $b_0, \ldots, b_6$ represent values of transmitted bits, in a similar manner to the DS-CDMA system 100. For example, positive entries can correspond to logical 0 and negative entries can correspond to logical 1. The absolute values $|b_0|, \ldots, |b_7|$ represent signal amplitudes of transmitted signals. In the DS-CDMA system 300 of the present invention, different amplitudes and polarities are chosen for signals from different streams (such that a desired average energy, $E_A$, is maintained).

The spreading sequences $\underline{w}_0, \underline{w}_1, \ldots, \underline{w}_7$ can be expressed as follows:

$\underline{w}_0=(1, 1, 1, 1, 1, 1, 1, 1,);$
$\underline{w}_1=(1, -1, 1, -1, 1, -1, 1, -1,);$
$\underline{w}_2=(1, 1, -1, -1, 1, 1, -1, -1,);$
$\underline{w}_3=(1, -1, -1, 1, 1, -1, -1, 1,);$
$\underline{w}_4=(1, 1, 1, 1, -1, -1, -1, -1,);$
$\underline{w}_5=(1, -1, 1, -1, -1, 1, -1, 1,);$
$\underline{w}_6=(1, 1, -1, -1, -1, -1, 1, 1,);$
$\underline{w}_7=(1, -1, -1, 1, -1, 1, 1, -1,).$ The sequences $\underline{w}_0, \underline{w}_1, \ldots, \underline{w}_7$ form rows of the Hadamard matrix $H_8$ of dimension eight (8), and therefore they are orthogonal. The variables $b_1, \ldots, b_6$ take new values every eight chips and the variable $b_0$ takes a new value every m chips. It is noted that during a time interval of 8 chips, the conventional DS-CDMA system 100 can transmit 6 bits (over two cycles). Thus, in order to transmit 6 bits with the DS-CDMA system 300 in the same time interval of 8 chips, only six user streams are needed. According to one aspect of the invention, the seventh user stream can be used to maintain performance (e.g., to improve the PAPR). Thus, during m chips the DS-CDMA system 300 will transmit $$6\frac{m}{8} + 1$$

bits of information and therefore the rate of the DS-CDMA system 300 equals the rate of the conventional DS-CDMA system 100:

$$R_B = \frac{\frac{6}{8}m+1}{m} = \frac{\frac{3}{4}m+1}{m} = R_A.$$

To be able to transmit seven streams of information, a code book of size $2^7$ is needed. Instead of defining a code book for the DS-CDMA system 300 explicitly, the code book is defined using an algorithm. The matrices $G_{pc}$ and $G_{rm}$ are defined as follows:

$$G_{pc} = \begin{bmatrix} 1 & 1 & 1 & 1 & 1 & 1 & 1 & 1 \\ 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \\ 0 & 0 & 0 & 0 & 1 & 0 & 0 & 1 \\ 0 & 0 & 0 & 0 & 0 & 1 & 0 & 1 \\ 0 & 0 & 0 & 0 & 0 & 0 & 1 & 1 \end{bmatrix},$$

$$G_{rm} = \begin{bmatrix} 1 & 1 & 1 & 1 & 1 & 1 & 1 & 1 \\ 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \end{bmatrix}.$$

The matrices $G_{pc}$ and $G_{rm}$ are generator matrices of the single parity check code and the first order Reed-Muller code of length 8 (see, e.g. F. J. MacWilliams and N. J. Sloane, The Theory of Error-Correcting Codes, North-Holland (1977)). They define properties of a code book B.

Let a be the signal amplitude used in the conventional DS-CDMA system 1100 and c, e and d be signal amplitudes for the DS-CDMA system 300 of the present invention. Let a binary vector $\underline{u}=(u_0, u_1, \ldots, u_6)$ take all $2^7=128$ possible values from $(0, 0, \ldots, 0)$ to $(1, 1, \ldots, 1)$. For each vector $\underline{u}$, the corresponding vector $\underline{b}$ is defined according to the following code book generation process 400, shown in FIG. 4:

1. Compute $\underline{v}=\underline{u}G_{pc}$
2. Compute $\underline{h}=G_{rm}\underline{v}^\perp$ (here $\perp$ indicates the vector transposition);
3. If $\underline{h}^\perp=(0,0,0,0)$ then assign t=2, else assign t=1;
4. Let $v_i=1-2v_i$, i=0, ..., 7;
5. Form the vector $\underline{b}$ as follows. If t=1 then assign $b_0=av_0$ and $b_i=cv_i$, i=1, ..., 7, else assign $b_0=av_0$, $b_i=ev_i$, i=1, ..., 6, and $b_7=-dv_7$.

Vectors $\underline{b}$ form the code book B.

For example, let $\underline{u}=(0, 1, 1, 0, 0, 0, 0)$. Then, $\underline{v}=(0,1,1,0,0,1,1,0)$ and further $\underline{h}^\perp=(0,0,0,0)$. Therefore, t=2 and $\underline{b}=(a,-e,-e,e,e,-e,-e,d)$.

It can be shown that any vectors $\underline{u}$ whose entries $u_4, u_5, u_6$ are all zeros will lead to t=2. In a further example, let $\underline{u}=(0, 1, 1, 0, 0, 0, 1)$. Then, $\underline{v}=(0, 1, 1, 0, 0, 1, 0, 1)$ and further $\underline{h}^\perp=(0, 1, 0, 0)$. Therefore, t=1 and $\underline{b}=(a, -c, -c, c, c, -c, c, -c)$.

It can be shown that any vectors $\underline{u}$ in which at least one of entries $u_4, u_5, u_6$ is not zero will lead to t=1.

PAPR of the DS-CDMA System 300

Vectors $\underline{b}$ that correspond to the case t=1 are referred to as vectors of the first type and vectors $\underline{b}$ that correspond to the case t=2 vectors of the second type. It can be shown that the number of vectors of the first type is $7 \cdot 16=112$ and the number of vectors of the second type is 16.

The power of a vector of the first type is $a^2+7c^2$. The power of a vector of the second type is $a+6e^2+d^2$. The total number of vectors is $2^7=128$. Hence, the average energy of a vector from the code book equals $$E_{vector} = \frac{112(a^2+7c^2)+16(a+6e^2+d^2)}{128}.$$

Using the Parseval rule of equation (7), the average energy per chip is expressed as follows:

$$E_B = \frac{1}{8}8E_{vector} = \frac{112(a^2+7c^2)+16(a+6e^2+d^2)}{128}. \quad (10)$$

In order to maintain the average energy per chip in the DS-CDMA system 300 the same as in the conventional DS-CDMA system 100, the amplitudes e, c, and d must be selected so that $E_B=E_A$, where $E_A$ is defined in equation (8).

Consider the PAPR of the DS-CDMA system 300 of the present invention. It can be shown that for any vector $\underline{b}$ of the first type, the corresponding output vector $\underline{s}=\underline{b}H_8$ will have one and the same set of absolute values of entries:

$$\{|a+3c|, |a-c|, |a-5c|\}.$$

It is noted that the vectors $\underline{u}$ that produce vectors $\underline{b}$ of the first type belong to cosets of the first order Reed-Muller code with the coset leader of weight two. The same is true for vectors $\underline{b}$ of the second type. In this case, the set of absolute values of entries of the output vector $\underline{s}=\underline{b}H$ is expressed as follows:

$$\{|a+6e-d|, |a+d|, |a-2e-d|\}.$$

Thus, the PAPR of the DS-CDMA system 300 is expressed as follows:

$$PAPR_B = \frac{\max\left\{ \begin{array}{l} |a+3c|^2, |a-c|^2, |a-5c|^2, \\ |a+6e-d|, |a+d|, |a-2e-d| \end{array} \right\}}{\frac{112(a^2+7c^2)+16(a+6e^2+d^2)}{128}}. \quad (11)$$

To obtain a system with a small PAPR, the amplitudes b, c, and e must be selected to provide $E_B=E_A$ and minimize expression (11).

In one exemplary solution of this optimization problem, the following amplitudes were obtained:

$$c=0.6125123893 \cdot a, \; e=0.611 \cdot a, \; d=1.837572876 \cdot a.$$

It can be shown that under this choice, $E_B=E_A$ and PAPR=2.013.

Variations of the DS-CDMA System 300

In addition to a small PAPR, a small bit error probability is also desired. A decoding algorithm will be described in the next section. It is noted that for minimizing the bit error probability, different approaches are used for channels with low and with high signal to noise ratios (SNR). In a channel with a high signal to noise ratio, a code book with a large minimum distance will have smaller bit error probability. The minimum distance of code book B is defined as follows:

$$d(B)=\min_{\underline{x},\underline{y}\in B}\{dist(\underline{x},\underline{y})=(x_0-y_0)^2+(x_1-y_1)^2+\ldots+(x_7-y_7)^2\}.$$

It is can be shown that vectors of the form $$\begin{pmatrix} a & e & e & e & e & e & e & -d \\ a & -e & -e & e & e & -e & -e & d \end{pmatrix}$$

will have the minimum pairwise distance, say $d_1$, among all pairs of vectors of the first type. Similarly, the vectors of the following form:

$$\begin{pmatrix} a, & c, & c, & c, & c, & c, & -c, & -c \\ a, & c, & c, & c, & c, & -c, & -c, & c \end{pmatrix}$$

will have the minimum pairwise distance, say $d_2$, among all pairs of vectors of the second type.

Finally, the vectors of the folllowing form:

$$\begin{pmatrix} a, & e, & e, & e, & e, & e, & e, & -d \\ a, & c, & c, & c, & c, & c, & -c, & -c \end{pmatrix}$$

will have the minimum pairwise distance, say $d_3$, among all pairs of vectors one of which is a vector of the first type and another is the vector of the second type. As previously indicated, for achieving small bit error probability in a channel with large SNR, the minimum distance of the code book must be maximized. This can be done by changing values for the constant amplitudes c, d, and e, which increases the PAPR of the system.

Assume that a PAPR equal to 2.2 is desired. It can be shown that the minimum of distances $d_2$ and $d_3$ will define the minimum distance of the code book, while the distance $d_1$ is always much larger than $d_2$ and $d_3$. Thus, an optimal choice of the constant amplitudes c, d, and e is one that provides $d_2 \approx d_3$ under the condition that $PAPR_B \approx 2.2$ and $E_A = E_B$.

For example, if $c=0.611617844 \cdot a$, $e=0.63$ $d_3$ a, and $d=1.813520605$ $d_3$ a are selected, then a DS-CDMA system is obtained with PAPR≈2.2009 and $d1 \approx 2.992 \cdot a^2$, $d2 \approx 2.987 \cdot a^2$, $d3 \approx 3.1752 \cdot a^2$.

Figure 5:
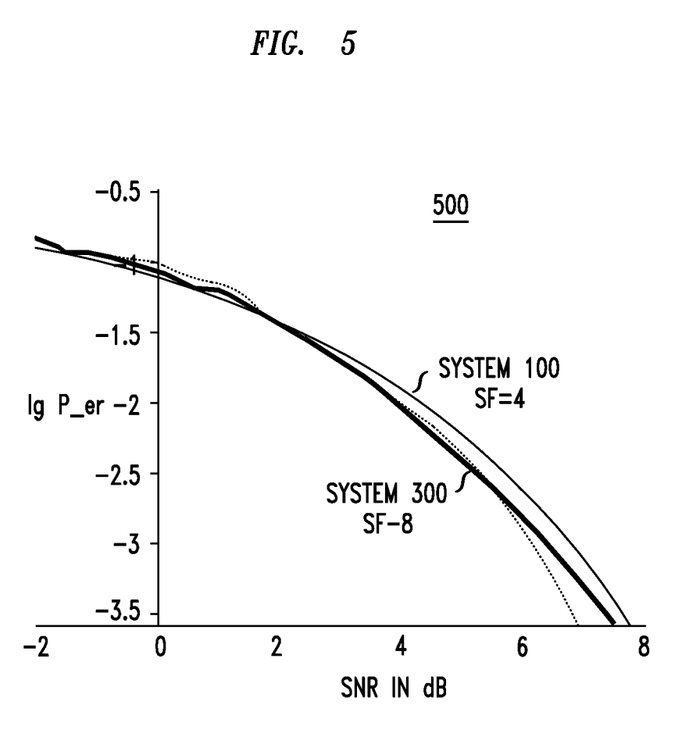
FIG. 5 is a plot illustrating the relative decoding performance (bit error probability versus signal-to-noise ratio) of the conventional DS-CDMA system of FIG. 1 and the DS-CDMA system of FIG. 3, in the presence of an additive white Gaussian noisy (AWGN) channel.

FIG. 5 is a plot 500 illustrating the relative decoding performance (bit error probability versus signal-to-noise ratio) of the conventional DS-CDMA system 100 and the DS-CDMA system 300 of the present invention, in the presence of an additive white Gaussian noisy (AWGN) channel. According to another aspect of the invention, two different code books are employed based on whether the channel exhibits low or high signal to noise ratios (SNR), distinguished by a specified threshold. Thus, to minimize the bit error probability, different approaches are used for channels with low and with high signal to noise ratios (SNR). In a channel with a high signal to noise ratio, a code book with a large minimum distance will have smaller bit error probability. For example, as shown in FIG. 5, for a SNR above 2, the codebook associated with the DS-CDMA system 300 of FIG. 3 will exhibit a better bit error probability.

Decoding for the DS-CDMA System 300

For reconstruction of the variable b, we use exactly the same procedure as in system A. Since in systems B and C we keep the same amplitude for signals transmitted in the 0th stream as in system A, the probability of error remains also the same. For reconstruction information from other streams in systems B and C we can also use the same procedure of despreading as in system A. However, since signal amplitudes for streams 1, 2, . . . , 7 are lower than in system A, the bit error probability will increase. For this reason, in addition to despreading, a posteriori probability (APP) decoding of the received vector can be used.

It is again assumed that a vector $\underline{b}=(b_0, b_1, \ldots, b_7)$ is transmitted. The output vector $$\underline{s} = \sum_{i=0}^{7} b_i \underline{w}_i$$

is transmitted through a noisy channel and the vector $\underline{x}=\underline{s}+\underline{z}$ is received. Without loss of generality, it is assumed that the channel is an additive white Gaussian noisy (AWGN) channel. In other words, it is assumed that the density function $f(z_i)$ of any element of the vector $\underline{z}$ can be expressed as:

$$f(z_i) = \frac{1}{\sqrt{2\pi\sigma^2}} e^{\frac{z_i^2}{2\sigma^2}},$$

where σ depends on the SNR of a channel.

Figure 6:
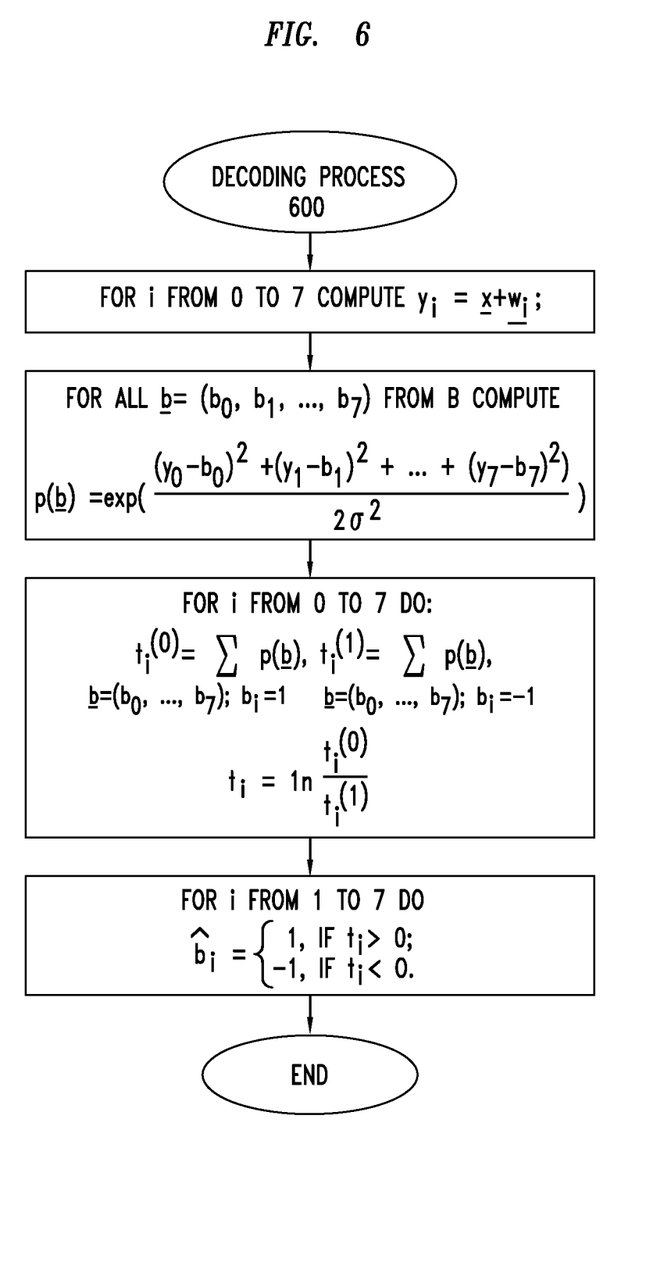
FIG. 6 is a flow chart describing an exemplary implementation of a decoding process.

FIG. 6 is a flow chart describing an exemplary decoding process 600. As shown in FIG. 6, the exemplary decoding process 600 performs as follows:

1. For i from 0 to 7 compute $$y_i = \underline{x} \cdot \underline{w}_i;$$

2. For all $\underline{b}=(b_0, b_1, \ldots b_7)$ from B compute $$p(\underline{b}) = \exp\left(\frac{(y_0 - b_0)^2 + (y_1 - b_1)^2 + \ldots + (y_7 - b_7)^2}{2\sigma^2}\right)$$

3. For i from 0 to 7 do $$t_i^{(0)} = \sum_{\underline{b}=(b_0, \ldots, b_7): b_i=1} p(\underline{b}),$$

$$t_i^{(1)} = \sum_{\underline{b}=(b_0, \ldots, b_7): b_i=-1} p(\underline{b}),$$

$$t_i = \ln \frac{t_i^{(0)}}{t_i^{(1)}}$$

4. For i from 0 to 7 do $$\hat{b}_i = \begin{cases} 1, & \text{if } t_i > 0; \\ -1, & \text{if } t_i < 0. \end{cases}$$

5. End.

Using standard arguments (see, e.g., L. R. Bahl et al., "Optimal Decoding of Linear Codes for Minimizing Symbol Error Rate," IEEE Trans. Inform. Theory, 20, 284-87 (1974)), it can be shown that:

$$t_i = \frac{Pr(\text{sign}(b_i) = 1 \mid \underline{x})}{Pr(\text{sign}(b_i) = -1 \mid \underline{x})}.$$

In other words, $t_i$ is the log likelihood ratio of the ith bit. The algorithm 600 requires about 1000 operations over real numbers.

It is to be understood that the embodiments and variations shown and described herein are merely illustrative of the principles of this invention and that various modifications may be implemented by those skilled in the art without departing from the scope and spirit of the invention.

We claim:

1. A method for generating a code book for use in a CDMA system, said code book comprised of a plurality of vectors, said method comprising:
    selecting an amplitude and polarity value for each vector of said code book to provide a reduced peak-to-average power ratio for transmissions that include data transmissions comprising one or more data symbols, wherein each vector in said code book depends on transmitted user data, wherein each vector in said code book depends on transmitted user data by generating a vector v by multiplying said transmitted user data by a generator matrix and using said vector v in the formation of each of said vectors in said code book.

2. The method of claim 1, wherein said CDMA system has a spreading factor of eight and eight distinct data streams.

3. The method of claim 2, wherein one of said data streams is slowly varying and at least six of said data streams are employed to carry user information.

4. The method of claim 3, wherein one or more of said data streams is reserved to maintain a desired data rate of said CDMA system.

5. The method of claim 4, wherein said desired data rate is based on a date rate of a CDMA system having a lower order spreading factor.

6. The method of claim 1, wherein said amplitude values are selected to maintain a desired energy per chip.

7. The method of claim 6, wherein said desired energy per chip is based on an energy per chip of a CDMA system having a lower order spreading factor.

8. The method of claim 1, further comprising the step of maintaining a desired data rate of said CDMA system.

9. The method of claim 1, wherein said selecting step further comprises the steps of selecting said amplitude values to provide said reduced peak-to-average power ratio while maintaining a desired average energy per chip.

10. The method of claim 1, further comprising the steps of generating a first code book to be used under a first signal-to-noise ratio condition and generating a second code book to be used under a second signal-to-noise ratio condition.

11. A transmitter in a CDMA system, comprising:
    a plurality of multipliers, each of said multipliers multiplying an encoded data stream by a corresponding spreading code, wherein said encoded data stream depends on transmitted user data and is based on a code book comprised of a plurality of vectors, each of said vectors having non-uniform amplitude values selected to provide a reduced peak-to-average power ratio for transmissions that include data transmissions comprising one or more data symbols, wherein said encoded data stream depends on transmitted user data by generating a vector v by multiplying said transmitted user data by a generator matrix and using said vector v in the formation of each of said vectors in said code book; and
    a combiner for aggregating an output of each of said plurality of multipliers for transmission.

12. The transmitter of claim 11, wherein said CDMA system has a spreading factor of eight and eight distinct data streams.

13. The transmitter of claim 12, wherein one of said data streams is slowly varying and at least six of said data streams are employed to carry user information.

14. The transmitter of claim 13, wherein one or more of said data streams is reserved to maintain a desired data rate of said CDMA system.

15. The transmitter of claim 11, wherein said amplitude values are selected to maintain a desired energy per chip.

16. The transmitter of claim 11, wherein said amplitude values provide said reduced peak-to-average power ratio while said transmitter maintains a desired average energy per chip.

17. The transmitter of claim 11, wherein said encoded data stream is based on a first code book to be used under a first signal-to-noise ratio condition and a second code book to be used under a second signal-to-noise ratio condition.

18. A system for generating a code book for use in a CDMA system, said code book comprised of a plurality of vectors, said system comprising:
    a memory; and
    at least one processor, coupled to the memory, operative to:
    select an amplitude and polarity for each vector of said code book to provide a reduced peak-to-average power ratio for transmissions that include data transmissions comprising one or more data symbols, wherein each vector in said code book depends on transmitted user data, wherein each vector in said code book depends on transmitted user data by generating a vector v by multiplying said transmitted user data by a generator matrix and using said vector v in the formation of each of said vectors in said code book.

19. The system of claim 18, wherein one or more of said data streams is reserved to maintain a desired data rate of said CDMA system.

20. The system of claim 18, wherein said amplitude values are selected to maintain a desired energy per chip.

21. The system of claim 20, wherein said desired energy per chip is based on an energy per chip of a CDMA system having a lower order spreading factor.

22. The system of claim 18, wherein said processor is further configured to maintain a desired data rate of said CDMA system.

23. The system of claim 18, wherein said processor is further configured to select said amplitude values to provide said reduced peak-to-average power ratio while maintaining a desired average energy per chip.

24. The system of claim 18, wherein said processor is further configured to generate a first code book to be used under a first signal-to-noise ratio condition and generate a second code book to be used under a second signal-to-noise ratio condition.

25. A communication method, comprising:
    encoding a data stream based on transmitted user data and a code book comprised of a plurality of vectors, each of said vectors having coefficient values that provide a reduced peak-to-average power ratio for transmissions that include data transmissions comprising one or more data symbols relative to a peak-to-average power ratio that would result if said vectors contained coefficient values of uniform magnitude, wherein said step of encoding a data stream based on transmitted user data further comprises the steps of generating a vector v by multiplying said transmitted user data by a generator matrix and using said vector v in the formation of each of said vectors in said code book.

26. The method of claim 25, further comprising the step of transmitting said encoded data stream.

27. The method of claim 25, further comprising the step of multiplying said encoded data stream by a corresponding spreading code.

28. The method of claim 25, wherein said encoded data stream is based on a first code book to be used under a first signal-to-noise ratio condition and a second code book to be used under a second signal-to-noise ratio condition.

* * * * *

UNITED STATES PATENT AND TRADEMARK OFFICE
CERTIFICATE OF CORRECTION

PATENT NO.       : 9,094,144 B2                              Page 1 of 1
APPLICATION NO.  : 10/835085
DATED            : July 28, 2015
INVENTOR(S)      : Alexei Ashikhmin et al.

It is certified that error appears in the above-identified patent and that said Letters Patent is hereby corrected as shown below:

In the Drawings

Figure 4:
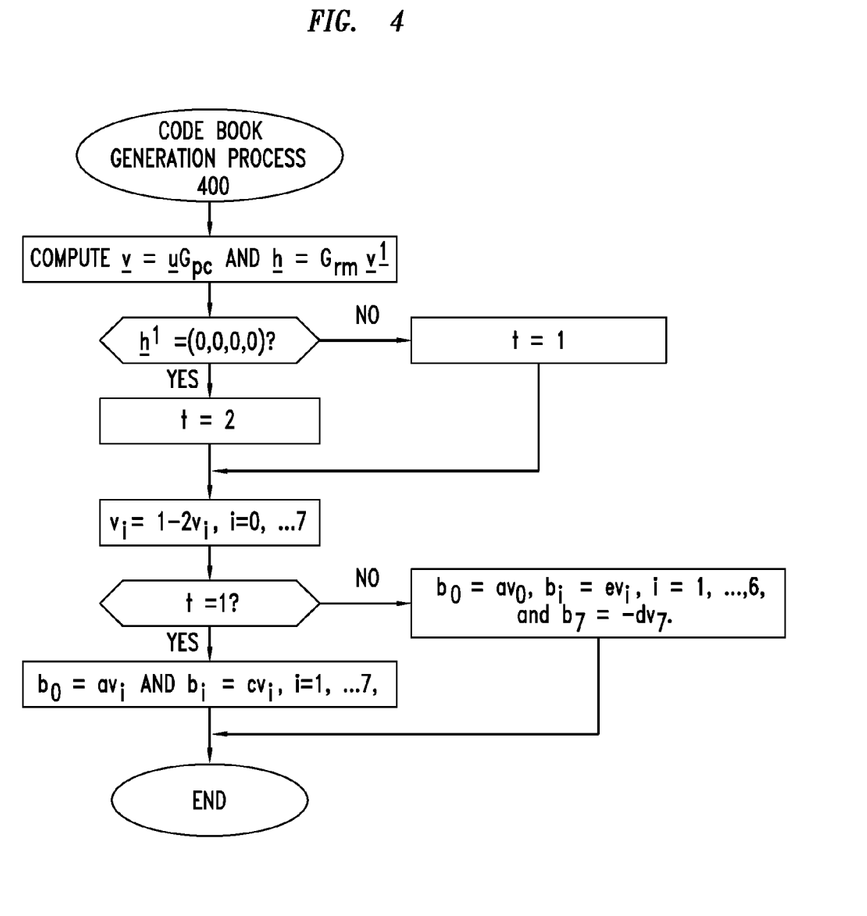
FIG. 4 is a flow chart describing an exemplary implementation of a code book generation process.

In the figures, sheet 4, Fig. 4, in the second box in the flowchart, replace the equation "$\underline{h} = G_m \underline{v}^1$" with --$\underline{h} = G_m \underline{v}^\perp$--.

In the figures, sheet 4, Fig. 4, in the third box in the flowchart, replace the equation "$\underline{h}^1 = (0,0,0,0)?$" with --$\underline{h}^\perp = (0,0,0,0)?$--.

In the Specification

Column 1, line 36, replace "which are commonly" with --which is commonly--.

Column 9, line 12, replace "the folllowing form" with --the following form--.

Column 9, line 20, replace "pairs of vectors one of" with --pairs of vectors, one of--.

Signed and Sealed this
Twelfth Day of April, 2016

Michelle K. Lee
*Director of the United States Patent and Trademark Office*